UNITED STATES PATENT OFFICE

NILS ERIK LENANDER, OF LOKKEN VERK, NORWAY, ASSIGNOR, BY MESNE ASSIGNMENTS, TO TEXAS GULF SULPHUR COMPANY, OF HOUSTON, TEXAS, A CORPORATION OF TEXAS

PRODUCTION OF ELEMENTAL SULPHUR FROM GASEOUS SULPHUR COMPOUNDS

No Drawing.   Application filed July 26, 1930.   Serial No. 471,100.

This invention relates to the production of elemental sulphur from gaseous sulphur compounds and has for its object the provision of certain improvements in the method of liberating elemental sulphur by the reaction of a gaseous sulphur compound with another gas, also preferably a sulphur compound. A further aim of the invention is to provide an improved catalyst and method of making the same for promoting the reaction between such a gaseous sulphur compound and another gas (preferably a sulphur compound) to form elemental sulphur.

The following reactions between gaseous sulphur compounds are well recognized and are technically utilized in various ways:

$$H_2S + SO_2 = H_2O + 3S$$
$$CS_2 + SO_2 = CO_2 + 3S$$
$$2COS + SO_2 = 2CO_2 + 3S$$

Various catalysts have heretofore been used for promoting these and similar reactions, and the velocity and completeness of the reaction is very largely dependent upon the effectiveness of the catalyst used.

I have found that hydrate of aluminum (or oxide of aluminum containing some proportion of combined water) is a highly effective catalytic agent for promoting the foregoing reactions. In the presence of this catalytic agent and at an elevated temperature, say above 300° C., the contemplated reaction proceeds at relatively high velocity until equilibrium is reached. For the optimum results, the aluminum hydrate should be substantially uncontaminated with other metallic oxides or compounds. I preferably employ substantially pure aluminum hydrate, such for example as prepared by precipitation. Aluminum hydrate as commercially prepared for the manufacture of metallic aluminum, and prior to the customary calcination operation, has given very satisfactory results in practice.

Since the contemplated reaction occurs at the contact of the reacting gases with the catalyst, it is important that this contact should be as intimate as possible. To this end, the catalytic material may be made into balls or agglomerates of appropriate size and placed in the catalytic chamber or tower in such a way that the reacting gases pursue a tortuous path in passing through the voids or spaces between the balls. Such balls may conveniently be made by briquetting a plastic mass of the catalytic material with any appropriate binder, such for example as sodium silicate. Such balls do not, however, possess very great strength, and consequently are easily broken and thereby impair the desired gas passages. Moreover, they are composed for the most part of the catalytic agent, of which only the surface portion of the balls is effectively utilized.

I have found that a highly efficient catalytic agent, such as aluminum hydrate, may be embodied in a porous cement, thereby greatly increasing the contacting surface of the catalytic material and permitting a corresponding reduction in the amount of catalytic agent required. Such a catalytic material may be conveniently made by mixing hydrate of aluminum and cement and adding thereto a small amount of such materials as cause the development of gas and sufficient water to give the desired consistency, and permitting the resulting mass to set after the development therein of sufficient gas to produce a porous cement-like product. A very strong and at the same time porous product can thus be formed, peculiarly adapted as the catalytic material for promoting the reactions hereinbefore mentioned. The development of the gas within the plastic mass may conveniently be effected by including therein a metallic powder, such as aluminum powder, which reacts with a suitable hydrate, like calcium hydrate, to liberate hydrogen gas. Appropriate gas development within the mass may be effected in any other suitable manner, the aim being to provide a highly porous cement-like product.

A very satisfactory product results from mixing a quick binding cement with from 10 to 15% of substantially pure hydrate of aluminum and a small amount, say from 0.1 to 1% by weight, of aluminum powder. These materials are thoroughly mixed in a dry condition, and calcium hydrate and water are then incorporated in the mixed materials in sufficient amounts to produce a sludge or wet cement mass and to effect the desired gas development. The resulting mass is placed in suitable receptacles, such as boxes, where it begins to rise or swell after 40 to 50 minutes forming a porous blistery product. After some time, depending on the binding capacity of the cement, the mass becomes hard and may be used directly, or may be crushed to pieces of appropriate size.

I claim:—

1. In the production of elemental sulphur by the reaction between a gaseous sulphur compound and another gas, subjecting the reacting gases at an elevated temperature to the catalytic action of aluminum hydrate embodied in a porous cement-like product.

2. In the production of elemental sulphur by reaction between a gaseous sulphur compound and another gas, subjecting the reacting gases at an elevated temperature to the action of a porous cement-like catalytic material containing from 10 to 15% of aluminum hydrate.

3. A catalytic material for promoting the formation of elemental sulphur by the reaction between a gaseous sulphur compound and another gas comprising a porous cement-like product in which is embodied a substantial amount of substantially pure aluminum hydrate.

4. A catalytic material for promoting the formation of elemental sulphur by the reaction between a gaseous sulphur compound and another gas comprising a porous cement-like product containing from 10 to 15% of substantially pure aluminum hydrate.

5. The method of forming a catalytic material for promoting the formation of elemental sulphur by the reaction between a gaseous sulphur compound and another gas which comprises mixing aluminum hydrate with cement and adding water to the resulting dry mixture until a mass of the desired consistency is obtained, and permitting the mass to harden after the development therein of sufficient gas to produce a porous product.

6. The method of forming a catalytic material for promoting the formation of elemental sulphur by the reaction between a gaseous sulphur compound and another gas which comprises mixing aluminum hydrate, cement and a metallic powder, adding a hydrate and sufficient water to produce a mass of desired consistency, and permitting the mass to harden after the development therein of sufficient gas to produce a porous product.

7. The method of forming a catalytic material for promoting the formation of elemental sulphur by the reaction between a gaseous sulphur compound and another gas which comprises mixing cement with from 10 to 15% of aluminum hydrate, adding water until a mass of the desired consistency is obtained, developing a gas within said mass, and causing the mass to set as a porous product in consequence of said gas development.

8. The method of forming a catalytic material for promoting the formation of elemental sulphur by the reaction between a gaseous sulphur compound and another gas which comprises mixing cement with from 10 to 15% of aluminum hydrate and a small amount of aluminum powder and adding water to the resulting mixture until a mass of the desired consistency is obtained, and permitting the mass to harden after the development therein of sufficient gas to produce a porous product.

In testimony whereof I have signed my name to this specification.

NILS ERIK LENANDER.